United States Patent
Barnes et al.

(10) Patent No.: US 10,683,139 B2
(45) Date of Patent: *Jun. 16, 2020

(54) REPLACEABLE FLUID CONTAINER

(71) Applicant: CASTROL LIMITED, Pangbourne, Reading (GB)

(72) Inventors: Andrew Philip Barnes, Norfolk (GB); Peter Stuart Brett, Berkshire (GB); Steven Paul Goodier, Oxfordshire (GB); Piers Sebastian Harding, Cambridgeshire (GB); Gary Keith Jepps, Cambridgeshire (GB); Mark O'Malley, Suffolk (GB); Thomas James McPherson, Cambridge (GB)

(73) Assignee: Castrol Limited, Reading (GB)

(*) Notice: Subject to any disclaimer, the term of this patent is extended or adjusted under 35 U.S.C. 154(b) by 180 days.

This patent is subject to a terminal disclaimer.

(21) Appl. No.: 15/873,891

(22) Filed: Jan. 17, 2018

(65) Prior Publication Data

US 2018/0141720 A1    May 24, 2018

Related U.S. Application Data

(63) Continuation of application No. 14/443,622, filed as application No. PCT/EP2013/074207 on Nov. 19, 2013, now Pat. No. 9,878,822.

(30) Foreign Application Priority Data

Nov. 19, 2012  (EP) ..................................... 12193246
Feb. 28, 2013  (EP) ..................................... 13157219
(Continued)

(51) Int. Cl.
B65D 25/38   (2006.01)
F01M 1/04    (2006.01)
(Continued)

(52) U.S. Cl.
CPC ............. *B65D 25/38* (2013.01); *B65D 25/20* (2013.01); *F01M 1/04* (2013.01);
(Continued)

(58) Field of Classification Search
CPC .......... B65D 25/38; B65D 25/20; F01M 1/04; F01M 11/0458; F01M 2011/0483; H02K 9/193
(Continued)

(56) References Cited

U.S. PATENT DOCUMENTS 2,817,373 A   12/1957  Tapp
2,976,864 A    3/1961  Ford
(Continued)

FOREIGN PATENT DOCUMENTS

CN   1091177   8/1994
CN   2549181   5/2003
(Continued)

*Primary Examiner* — James N Smalley
*Assistant Examiner* — Madison L Poos
(74) *Attorney, Agent, or Firm* — McDonnell Boehnen Hulbert & Berghoff LLP (57) ABSTRACT

A replaceable fluid container for a vehicle, the container comprising: a housing comprising a fluid reservoir; an outlet port arranged on the housing to couple the reservoir in fluidic communication with a fluid system of the vehicle for supplying fluid from the reservoir to the vehicle; an inlet port arranged on the housing to couple the reservoir for receiving fluid from the engine to the reservoir; and a vent port arranged on the housing to couple the reservoir for allowing gas to be passed into and out from the reservoir, wherein the inlet, outlet and vent ports are arranged on a common end of the housing and are arranged such that the distance between the vent port and the nearest of the inlet port and outlet port is greater than the distance between the inlet port and the outlet port.

20 Claims, 3 Drawing Sheets

(30) Foreign Application Priority Data

Feb. 28, 2013 (EP) ..................................... 13157220
Feb. 28, 2013 (EP) ..................................... 13157223

(51) Int. Cl.
*B65D 25/20* (2006.01)
*F01M 11/04* (2006.01)
*H02K 9/193* (2006.01)

(52) U.S. Cl.
CPC ......... *F01M 11/0458* (2013.01); *H02K 9/193* (2013.01); *F01M 2011/0483* (2013.01)

(58) Field of Classification Search
USPC ..................................................... 220/562
See application file for complete search history.

(56) References Cited

U.S. PATENT DOCUMENTS

| | | |
|---|---|---|
| 3,246,802 A | 4/1966 | Fuhrmann |
| 3,399,776 A | 9/1968 | Knuth |
| 4,060,105 A | 11/1977 | Feldelsen et al. |
| 4,151,823 A | 5/1979 | Grosse et al. |
| 4,676,287 A | 6/1987 | Fitzwater |
| 5,545,354 A | 8/1996 | Ofosu-Asante |
| 5,640,936 A | 6/1997 | Hudson |
| 6,048,454 A | 4/2000 | Jenkins |
| 6,348,149 B1 | 2/2002 | Jenkins |
| 6,793,818 B1 | 9/2004 | Entringer et al. |
| 9,878,822 B2 | 1/2018 | Barnes et al. |
| 2006/0180395 A1 | 8/2006 | Graf |
| 2009/0211552 A1 | 8/2009 | Prior et al. |
| 2011/0253092 A1 | 10/2011 | Springer et al. |
| 2015/0291317 A1 | 10/2015 | Brett et al. |
| 2015/0292371 A1 | 10/2015 | Barnes et al. |
| 2015/0292372 A1 | 10/2015 | Barnes et al. |
| 2015/0292674 A1 | 10/2015 | Brett et al. |

FOREIGN PATENT DOCUMENTS

| | | |
|---|---|---|
| CN | 102515070 | 6/2012 |
| DE | 10136971 | 2/2003 |
| DE | 102008040748 | 1/2010 |
| DE | 102012024365 | 6/2014 |
| EP | 1104867 | 6/2001 |
| FR | 2 633 976 | 1/1990 |
| FR | 2881508 | 8/2006 |
| WO | WO 01/53663 | 7/2001 |
| WO | WO 03/106598 | 12/2003 |
| WO | WO 2016/158971 | 10/2016 |

REPLACEABLE FLUID CONTAINER

This application is a continuation of U.S. application Ser. No. 14/443,622 filed May 18, 2015 which is a U.S. National Phase of International Application No. PCT/EP2013/074207 filed Nov. 19, 2013 which designated the U.S. and claims priority to European Patent Application No. 12193246.1 filed Nov. 19, 2012, European Patent Application No. 13157223.2 filed Feb. 28, 2013, European Patent Application No. 13157219.0 filed Feb. 28, 2013, and European Patent Application No. 13157220.8 filed Feb. 28, 2013, each of which is hereby incorporated by reference in its entirety.

This invention relates to replaceable fluid containers for vehicles and engines. The invention also relates to an apparatus comprising such a container in fluidic communication with a fluid system and to a vehicle comprising such an apparatus.

Many vehicle engines use one or more fluids for their operation. Such fluids are often liquids. For example, internal combustion engines use liquid lubricating oil compositions. Also, electric engines use heat exchange liquids for example to cool the engine, to heat the engine or to cool and heat the engine during different operating conditions. Such fluids are generally held in reservoirs associated with the engine and may require periodic replacement.

Conventional periodic replacement of engine lubricating oil composition in a vehicle engine usually involves draining the composition from the engine sump. The process may also involve removing and replacing the engine oil filter. Such a procedure usually requires access to the engine sump drain plug and oil filter from the underside of the engine, may require the use of hand tools and usually requires a suitable collection method for the drained lubricating oil composition.

Attempts have been made to provide a quick-change oil filter/reservoir system for an internal combustion engine.

U.S. Pat. No. 4,151,823 relates to a quick-change oil filter/reservoir system for an internal combustion engine having a primary oil pump and oil sump comprising a cartridge containing an oil filter element and supply of oil. In one embodiment shown in FIG. 1 of U.S. Pat. No. 4,151,823, and described at col. 3 lines 22 to 30, the cartridge is said to be retained on the mounting plate by conventional quick release mountings. The tabs and spring clips shown in the embodiment of FIG. 1 of U.S. Pat. No. 4,151,823 are on the end of the cartridge bearing the inlet and outlet ports. The breather cap in this embodiment is shown with a pipe connected to the cap.

U.S. Pat. No. 5,640,936 relates to a removable oil storage and supply tank for a dry sump four cycle internal combustion engine. According to one embodiment illustrated in FIG. 3 and described at col. 3 line 27 to col. 4 line 46 a tank 30 is supported at the bottom by the male portion 62 of three quick disconnect connectors 60. All three oil lines 54, 56 and 58 are said therein to be attached to the tank 30 by quick disconnect fluid connectors 60 which penetrate the bottom of the tank 30. According to the document at col. 4 lines 28 to 36, a tube 50 is attached to the top of the female member 64 of the connector 60 connected to the oil scavenger line 56. At col. 4 lines 37 to 41 it is stated that a tube 51 is attached to the top of the female member 64 of the connector 60 connected to the oil vent line 58. It is stated therein that this tube 51 extends the vent line 58 into the air space in the tank 30 above the oil level 52 so as to vent the same to the crankcase. At col. 4 lines 41 to 46 it is stated that the oil line 54, through which oil is drawn for lubricating the engine 10, terminates in a quick disconnect fluid connector 60 which includes an oil inlet 67. It is stated therein that this inlet 67 is positioned near the bottom of the tank 30 so that oil will be drawn from the tank even if the oil is reduced to a very low level.

U.S. Pat. No. 6,348,149 relates to a manufacture for filtering oil. An embodiment is illustrated in FIGS. 2 to 9 and described at col. 4 line 13 to col. 7 line 44. At col. 5 lines 19 to line 32 quick-disconnect couplings are described. It is stated at col. 5 lines 27 to 31:

"Further, the geometrical locations of the elements of the quick disconnect QD's in both the block 58 of mechanism 57 and on the top of the housing 22 prevent wrong-way hook-up or connection of such lines to such housing, . . . "

At col. 6 lines 55 to 64 it is stated:

"To prevent an incorrect hook-up of lines or hoses to the cylinder's nipples, although in linear alignment with one another, the axis of the center hole in block 58 is closer to the axis of one of the two exterior disposed holes 59 than the other, thereby preventing a wrong-way hook-up of the lines or hoses to the upper housing 22 of receptacle 21 . . . "

In FIG. 4 vent plug 52 is shown between inlet plug 53 and outlet plug 51.

There remains a need for a replaceable fluid container

According to an aspect of the present invention there is provided a replaceable fluid container for a vehicle, for example a vehicle engine, the container comprising:

a housing comprising a fluid reservoir;

an outlet port arranged on the housing to couple the reservoir in fluidic communication with a fluid system of the vehicle for supplying fluid from the reservoir to the engine;

an inlet port arranged on the housing to couple the reservoir in fluidic communication with the fluid system of the engine for receiving fluid from the engine to the reservoir; and a vent port arranged on the housing to couple the reservoir in fluidic communication with the engine for allowing gas to be passed into and out from the reservoir, wherein the inlet, outlet and vent ports are arranged on a common end of the housing and are arranged such that the distance between the vent port and the nearest of the inlet port and outlet port is greater than the distance between the inlet port and the outlet port.

The vent port is connectable in fluidic communication with the vehicle for example with the fluid system of the engine. Additionally or alternatively, when the engine is an internal combustion engine the vent port is connectable in fluidic communication for example, with an air inlet manifold of the vehicle engine.

These and other examples of the disclosure facilitate coupling of the reservoir with the fluid system of the vehicle, for example of the vehicle engine. In particular, these and other examples of the disclosure avoid or at least mitigate the risk of incorrect coupling of inlet ports, outlet ports and vents ports with corresponding ports on a fluid system for example of a vehicle e.g. a vehicle engine fluid system. Thus, it is possible to ensure correct connection even by an unskilled user. Furthermore, because of the location of the respective ports on the housing and the related fluid system it is possible to minimise the possibility of cross-contamination between various ports, retaining the integrity of the fluid system as well as the integrity of the contents of the reservoir.

According to a further aspect of the present disclosure there is provided an apparatus comprising a replaceable fluid container for a vehicle, for example a vehicle engine, the container comprising: a housing comprising a fluid reservoir; an outlet port arranged on the housing to couple the reservoir in fluidic communication with a fluid system of the vehicle for supplying fluid from the reservoir to the vehicle; an inlet port arranged on the housing to couple the reservoir in fluidic communication with the fluid system of the vehicle for receiving fluid from the vehicle to the reservoir; and a vent port arranged on the housing to couple the reservoir in fluidic communication with the vehicle for allowing gas to be passed into and out from the reservoir, wherein the inlet, outlet and vent ports are arranged on a common end of the housing and are arranged such that the distance between the vent port and the nearest of the inlet port and outlet port is greater than the distance between the inlet port and the outlet port, in fluidic communication with a fluid system of a vehicle for example a vehicle engine through the inlet port and outlet port and in fluidic communication with the vehicle through the vent port. Suitably, the container is in fluidic communication with a fluid system of a vehicle engine through the inlet port and outlet port and in fluidic communication with the engine through the vent port.

The vent port is connected in fluidic communication with the vehicle, for example with an engine of the vehicle, for example with the fluid system of the engine. Additionally or alternatively, when the engine is an internal combustion engine the vent port is connected in fluidic communication for example, with an air inlet manifold of the engine.

According to yet a further aspect of the present disclosure there is provided a vehicle comprising an apparatus comprising a replaceable fluid container for a vehicle, for example a vehicle engine, the container comprising: a housing comprising a fluid reservoir; an outlet port arranged on the housing to couple the reservoir in fluidic communication with a fluid system of the vehicle for supplying fluid from the reservoir to the vehicle; an inlet port arranged on the housing to couple the reservoir in fluidic communication with the fluid system of the vehicle for receiving fluid from the engine to the reservoir; and a vent port arranged on the housing to couple the reservoir in fluidic communication with the vehicle for allowing gas to be passed into and out from the reservoir, wherein the inlet, outlet and vent ports are arranged on a common end of the housing and are arranged such that the distance between the vent port and the nearest of the inlet port and outlet port is greater than the distance between the inlet port and the outlet port, in fluidic communication with a fluid system of an engine through the inlet port and outlet port and in fluidic communication with the engine through the vent port.

The vent port is connected in fluidic communication with the vehicle, for example with an engine of the vehicle, for example with the fluid system of the engine. Additionally or alternatively, when the engine is an internal combustion engine the vent port is connected in fluidic communication for example, with an air inlet manifold of the engine.

In at least some example, the inlet port, the outlet port and the vent port are arranged in a linear radial alignment on the end of the housing.

In at least some examples the inlet port, the outlet port and the vent port are arranged in a linear radial alignment on the end of the housing and the vent port is arranged radially outermost of the inlet port, outlet port and vent port. Thus, the inlet port is the radially innermost port, the outlet port is the radially mid port and the vent port is the radially outermost port. These and other examples of the disclosure have an advantage that the distance between the vent port and the inlet port is maximised. This avoids or at least mitigates entrainment or other contamination of the vent gas with fluid being returned to the reservoir.

In at least some examples the inlet port, outlet port and vent port are arranged on the end of the housing in non-linear radial alignment such that the radial distance between the vent port and the nearest of the inlet port and outlet port is greater than the radial distance between the inlet port and the outlet port.

In at least some examples the inlet port, outlet port and vent port are arranged on the end of the housing in non-linear radial alignment such that the radial distance between the vent port and the nearest of the inlet port and outlet port is greater than the radial distance between the inlet port and the outlet port and the vent port is arranged radially outermost of the inlet port, outlet port and vent port. Thus, the inlet port is the radially innermost port, the outlet port is the radially mid port and the vent port is the radially outermost port. These and other examples of the disclosure have an advantage that the distance between the vent port and the inlet port is maximised. This avoids or at least mitigates entrainment or other contamination of the vent gas with fluid being returned to the reservoir.

In at least some examples at least one sealing or separating member is provided around at least one of the ports, for example around all of the ports.

In at least some examples additionally or alternatively at least one sealing or separating member is provided between at least two of the ports.

The inlet port, outlet port and vent port may be arranged on a coupling mechanism.

In at least some examples the coupling mechanism is arranged such that the container is connectable to couple the reservoir in fluidic communication with the vehicle, for example with an engine of the vehicle, for example with the fluid system of the engine by relative movement between the container and the vehicle and/or engine that is in a linear direction.

In at least some examples the coupling mechanism is arranged such that the container is connectable to couple the reservoir in fluidic communication with the vehicle, for example with an engine of the vehicle, for example with the fluid system of the engine by relative movement between the container and the vehicle and/or engine that is in a rotational direction. The rotation may through an angle of less than 360 degrees, for example through an angle of between 10 degrees and less than 360 degrees, or through an angle of between 10 degrees and 180 degrees, or through an angle of between 10 and 60 degrees, or through an angle of about 25 degrees.

Each port may comprise a self-sealing port. In general, self-sealing ports have the characteristic that when corresponding ports are being connected, a seal is made between the connecting ports before valve or valves open to allow fluid to flow. On disconnection, the valve or valves close to seal off each of the ports before the seal between the ports is broken. Suitable valves include spring loaded poppet valves and biased non-return valves.

Each self-sealing port of the container may provide a "dry break" in which no fluid flows on connection or disconnection of the ports. Alternatively, each self-sealing port of the system may provide a "damp break" in which there is flow of only a non-essential amount of fluid, for example a few drips of liquid, on disconnection or connection of the port.

In some examples, the inlet port and the outlet port may each or both comprise a non-return valve. Suitably, the vent port does not comprise a non-return valve.

In some examples the container may comprise a key for example a protrusion or recess configured to engage with a complimentary feature of the vehicle and/or engine and/or fluid system. This may further inhibit the container from being coupled to the fluid system unless the ports are in a selected orientation with respect to corresponding ports of the vehicle and/or fluid system and/or engine.

In at least some example the container contains a fluid, for example a liquid. The liquid may be a liquid for a self-sustaining fluid system for example lubricating oil composition for example an engine lubricating oil composition or a heat exchange fluid for example a heat exchange fluid for an electric engine. The liquid may be a liquid for a non-sustaining fluid system, for example deicer, water and/or detergent.

The reservoir may be a reservoir for a fluid which is a liquid. The liquid may be lubricating oil composition, for example lubricating oil composition, or heat exchange fluid for an electric engine.

Thus, the container may be provided as a self-contained system containing fresh, refreshed or unused engine lubricating oil composition which may conveniently replace a container on an engine which container comprises a reservoir containing used or spent engine lubricating oil composition. If the container also comprises a filter, this also is replaced together with the spent or used heat exchange fluid.

The engine lubricating oil may have heat exchange properties.

The lubricating oil composition, for example engine lubricating oil composition, may comprise at least one base stock and at least one lubricating oil additive. Suitable base stocks include bio-derived base stocks, mineral oil derived base stocks, synthetic base stocks and semi synthetic base stocks. Suitable lubricating oil composition additives for example engine lubricating oil composition additives are known in the art. Examples of additives include organic and/or inorganic compounds. Typically, according to at least some examples, the lubricating oil composition comprises about 60 to 90% by weight in total of base stocks and about 40 to 10% by weight additives. Suitable engine lubricating oil compositions include lubricating oil compositions for internal combustion engines.

The lubricating oil composition may be a mono-viscosity grade or a multi-viscosity grade engine lubricating oil composition. Examples of suitable lubricating oil compositions include single purpose lubricating oil compositions and multi-purpose lubricating oil compositions.

According to at least some examples, the lubricating oil composition is an engine lubricating oil composition for an internal combustion engine, for example a spark ignition internal combustion engine and/or a compression internal combustion engine.

The liquid may be a heat exchange fluid for an electric engine. Thus, the container may be provided as a self-contained system containing fresh, refreshed or unused heat exchange fluid for an electric engine which may conveniently replace a container on an engine which container comprises a reservoir containing used or spent heat exchange fluid. If the container also comprises a filter, this also is replaced together with the spent or used heat exchange fluid.

Suitable heat exchange fluids for electric engines include aqueous and non-aqueous fluids. Suitable heat exchange fluids for electric engines include those which comprise organic and/or non-organic performance boosting additives. Suitable heat exchange fluids include be man-made or bio-derived fluids, for example Betaine. According to at least some embodiments, the heat exchange fluids have fire retarding characteristics and/or hydraulic characteristics. Suitable heat exchange fluids include phase change fluids. Suitable heat exchange fluids include molten metals and salts. Suitable heat exchange fluids include nanofluids. Nanofluids comprise nanoparticles suspended in a base fluid, which may be solid, liquid or gas. Suitable heat exchange fluids include gases and liquids. Suitable heat exchange fluids include liquefied gases.

Whilst fluid systems for vehicles, for example vehicle engines, have been described herein the present invention also relates to fluid systems for engines in general whether or not associated with a vehicle.

Thus, according to a further aspect of the present invention there is provided a replaceable fluid container for an engine, for example a vehicle engine, the container comprising:
a housing comprising a fluid reservoir;
an outlet port arranged on the housing to couple the reservoir in fluidic communication with a fluid system of the engine for supplying fluid from the reservoir to the engine;
an inlet port arranged on the housing to couple the reservoir in fluidic communication with the fluid system of the engine for receiving fluid from the engine to the reservoir; and
a vent port arranged on the housing to couple the reservoir in fluidic communication with the engine for allowing gas to be passed into and out from the reservoir,
wherein the inlet, outlet and vent ports are arranged on a common end of the housing and are arranged such that the distance between the vent port and the nearest of the inlet port and outlet port is greater than the distance between the inlet port and the outlet port.

According to another embodiment there is provided an apparatus comprising a container as herein described in fluidic communication with the fluid system of a vehicle, for example with the fluid system of a vehicle engine through the inlet port and the outlet port and in fluidic communication with the vehicle for example with an engine of the vehicle through the vent port.

According to another embodiment there is provided an apparatus comprising a container as herein described in fluidic communication with the fluid system of an engine, for example a vehicle engine through the inlet port and the outlet port and in fluidic communication with the engine through the vent port.

According to another aspect there is provided a vehicle comprising an apparatus as herein described.

The engine may be an internal combustion engine. Suitable internal combustion engines include spark ignition internal combustion engines and compression ignition internal combustion engines. The engine may be an electric engine.

Suitable vehicles include motorcycles, earthmoving vehicles, mining vehicles, heavy duty vehicles and passenger cars.

The invention extends to methods and/or apparatus substantially as herein described with reference to the accompanying drawings.

Any feature in one aspect of the invention may be applied to other aspects of the invention, in any appropriate combination. In particular, features of method aspects may be applied to apparatus aspects, and vice versa.

The invention will now be described by way of example only and with reference to the following drawings in which.

In the drawings like reference numerals are used to indicate like elements.

Figure 1:
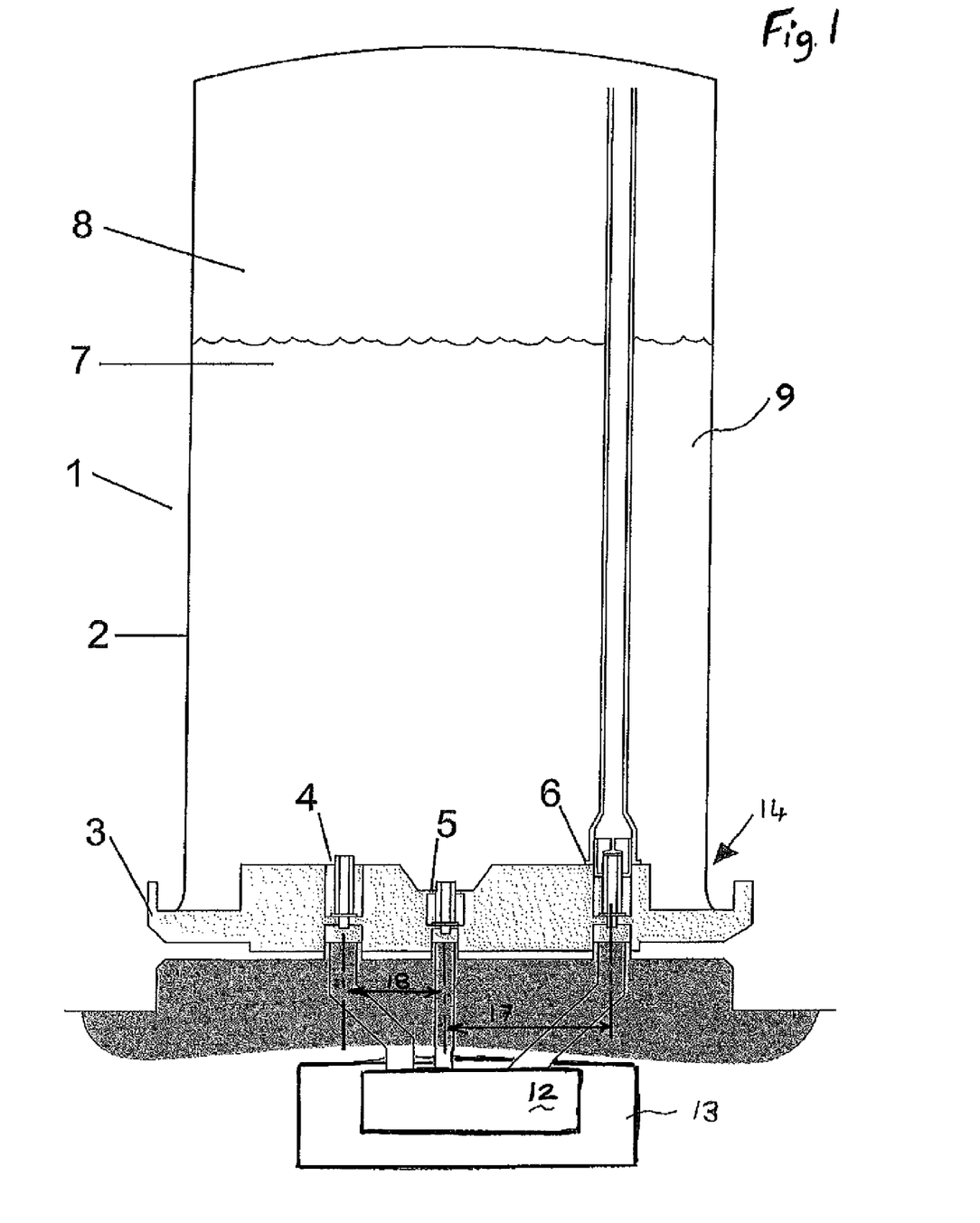
FIG. 1 is a schematic side cross-sectional view of a container according to the present invention.

Referring to FIG. 1, a container 1 according to the present invention has an housing 2 for example comprised of a plastics material and/or metal. Coupled to the housing 2 is a coupling mechanism 3. The coupling mechanism 3 comprises ports 4,5,6 that, in use, engage with a valve mechanism for fluidic communication with a fluid system 12 of an engine, for example a vehicle engine. The coupling mechanism 3 may be comprised of a plastics material and/or metal with the ports 4,5,6 formed integral therewith. The coupling mechanism 3 may include a quick release component (not shown) for connection to a connector (not shown) on the engine 3. The container 1 comprises a reservoir 9 which contains a fluid 7 for the fluid system 12 of the engine 13. The reservoir 9 is in fluidic communication with fluid system 12 of the engine 13 for supplying fluid 7 to the engine fluid system 12 through outlet port 5. The reservoir 9 is in fluidic communication with fluid system 12 of the engine 13 for receiving fluid 7 from the engine fluid system 12 through inlet port 4. A vent port 6 is in fluidic communication with the engine fluid system 13 for allowing gas to be passed into and out from the reservoir 9. Additionally, or alternatively the vent port may be in fluidic communication with an air inlet manifold of an internal combustion engine. This also enables fluid 7 to flow via outlet port 5 under gravity or by pumping when the reservoir is in fluid communication with the engine fluid system 12. Fluid returning to the container 1 may be passed through a filter (not shown).

In use, the container 1 is supplied as a unit or cartridge and is then connected to the engine so that fluid 7 can be supplied to the engine fluid system through outlet port 5 and received from the engine through inlet port 4. The connection to connect the reservoir in fluidic communication with the fluid system of the engine made should be simple and straightforward performed by even an untrained user. In practice it may be performed by relative movement between the container and the engine in a linear direction. Alternatively, the coupling mechanism 3 is arranged such that the container is connected to couple the reservoir in fluidic communication with the fluid system of the engine by relative movement between the container and the engine that is in a rotational direction. Opposite movement of the container then enables removal once the container 1 has come to the end of its operational life so that it can be disposed of and a new container 1 provided.

In either manner of connection it is important that there is no cross-contamination between the ports 4,5,6. In particular, it is important that no fluid contaminates the vent port 6 so that for example, fluid does not enter an air intake manifold or other gas handling system within the engine. A separating sealing member or members 10 may be provided to achieve this.

It is also important that the container be connected in a way that erroneous connection is not possible such that the ports 4,5,6 are not connected to the incorrect connector on the engine.

Figure 2:
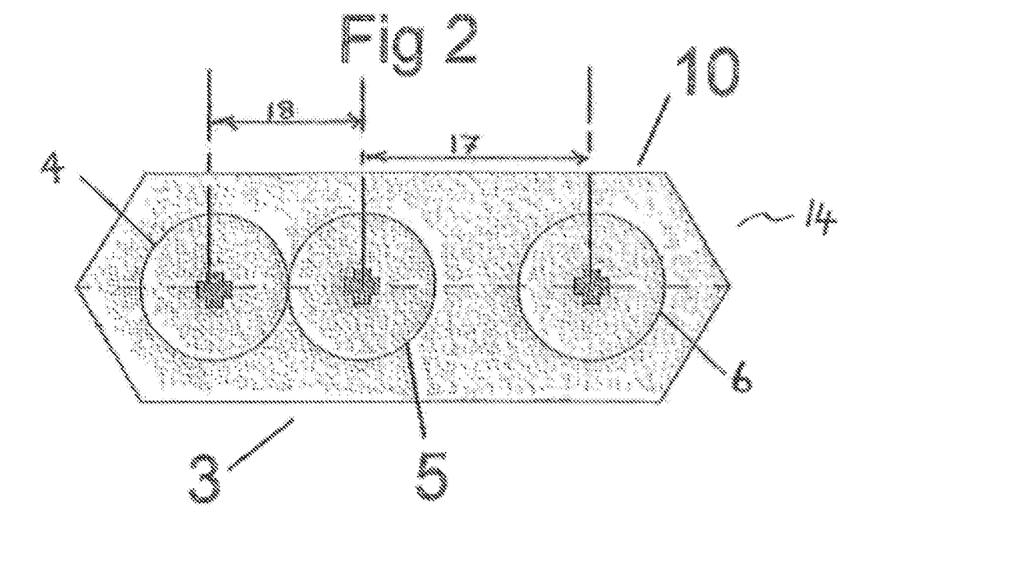
FIG. 2 is a plan view of a first port configuration employed with a container of the present invention of the type shown in FIG. 1.

This is achieved for example by an arrangement shown in FIG. 2. Referring to FIG. 2, this shows the arrangement of ports 4, 5 and 5 such as might be present in the container of FIG. 1. In FIG. 2 the ports 4, 5, 6 are arranged on a common end 14 of the housing 2 such that the distance 17 between the vent port 6 and the nearest of the inlet port 4 and the outlet port 5 is greater than the distance 18 between the inlet port 4 and the outlet port 5. This ensures that it is not possible for a user to connect the container the wrong way around by inserting it in the wrong direction, or to provide partial connection which enables cross-contamination particularly between the vent port 6 and either of the other ports.

Figure 3:
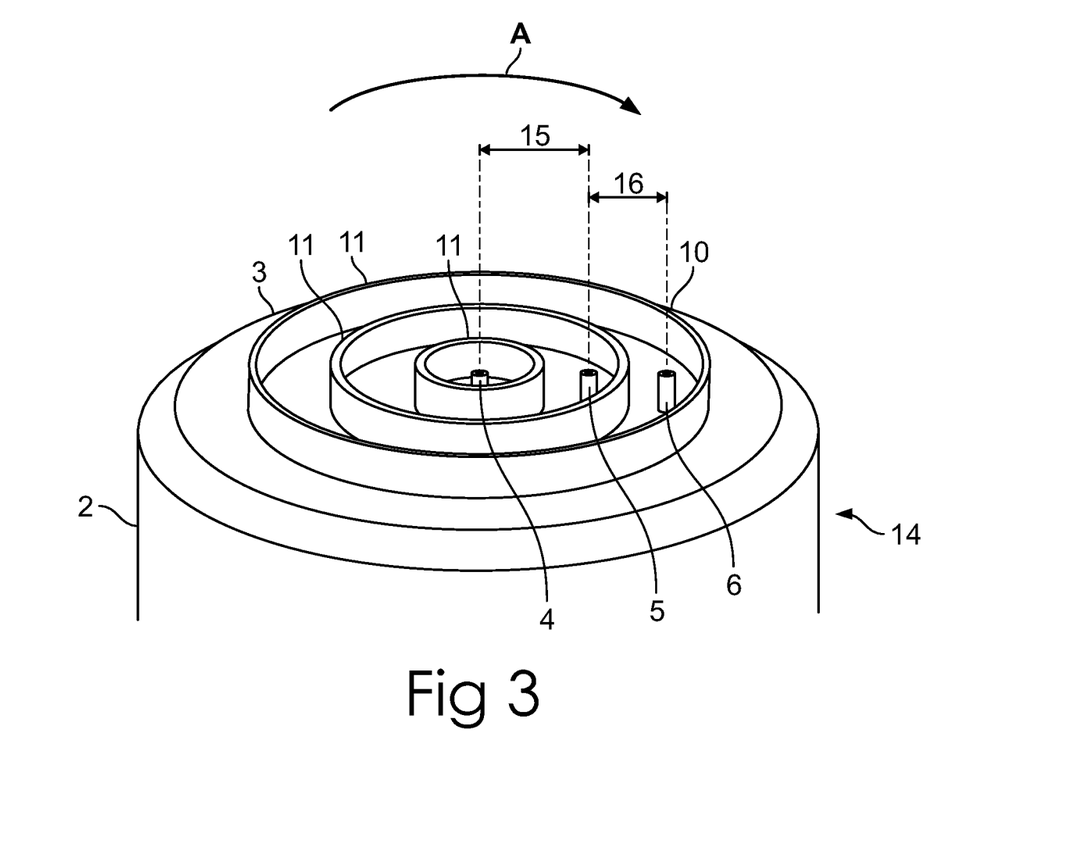
FIG. 3 is a side perspective view of a port connector configuration that can be employed with the container of the invention as shown in FIG. 1.

FIG. 3 shows an example for arrangement of ports 4, 5 and 6 on a coupling mechanism 3 which such as shown in FIG. 1. In FIG. 3 the inlet port 4, the outlet port 5 and the vent port 6 are arranged in a linear radial alignment on the end 14 of the housing 2. The vent port 6 is arranged radially outermost of the inlet port 4, outlet port 5 and vent port 6.

Alternatively, the ports, 4, 5, 6 may be arranged in a non-linear radial alignment such that the radial distance 16 between the vent port 6 and the nearest of the inlet port 4 and outlet port 5 is greater than the radial distance 15 between the inlet port and the outlet port. The vent port 6 may be arranged radially outermost on the end of the housing 2.

Figure 4:
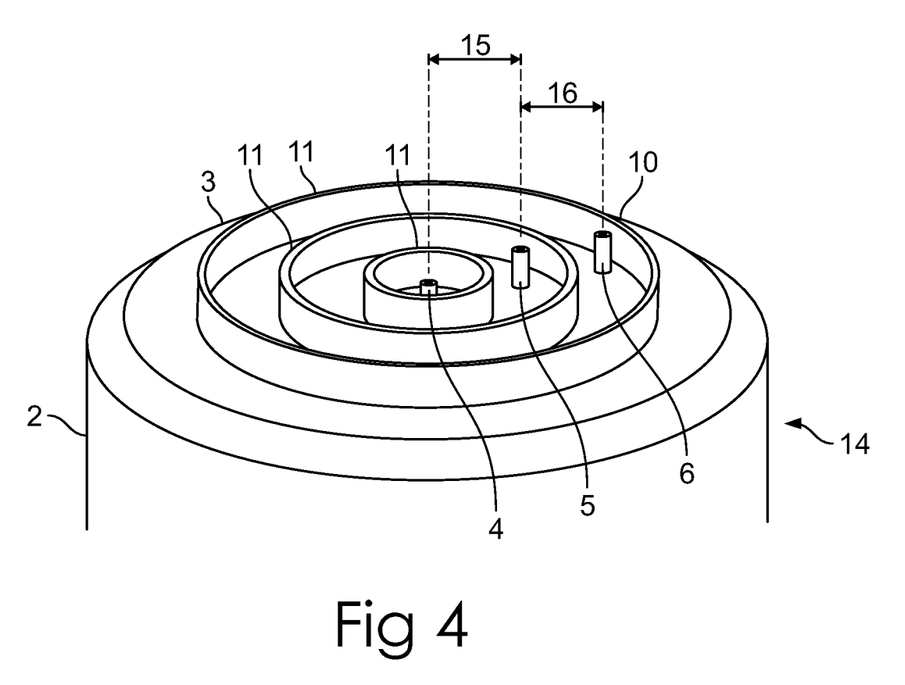
FIG. 4 is a side perspective view of another port connector configuration that can be employed with the container of the invention as shown in FIG. 1.

FIG. 4 shows an example arrangement of ports 4, 5, and 6 on a coupling mechanism 3 in which ports 4, 5, 6 are arranged on the end 14 of the housing 2 in a non-linear radial alignment.

In an alternative arrangement, the inlet port, the outlet port and the vent port may be arranged in a linear radial alignment on the end of the housing, the inlet, outlet and vent ports being arranged on a common end of the housing such that the distance between the vent port and the nearest of the inlet port and outlet port is greater than the distance between the inlet port and the outlet port.

Separators 11 are provided between the ports 4, 5,6.

The coupling mechanism 3 can be connected to couple the reservoir 9 in fluidic communication with the fluid system 12 of the engine 13 by relative movement between the container 1 and the engine 13 that is a rotational direction shown in FIG. 3 as arrow A.

The container may be used with an engine, for example an internal combustion engine or an electric engine. The engine may be a vehicle engine.

With the configuration of the present invention it is therefore possible to provide a replaceable fluid container for use with an engine which provides ease of insertion in a safe and controlled manner.

While aspects of the invention have been described in relation to vehicle engines and examples of the invention described the use of engine lubricating oil compositions, it is envisaged that features of the invention could find other applications.

For example, a fluid container according to an aspect of the invention could be used in relation to a fluid system of a wide range of apparatus or equipment. For example, the fluid container could find application in relation to various static and movable machines, for example industrial machines such as a lathe, or manufacture and assembly equipment, to an engine, or to a vehicle.

Examples of a fluid container of an aspect of the invention could thus be used to supply lubricant composition to a region of the apparatus or equipment, for example to a region including one or more moving parts, for example a gearbox. In an example of an aspect of the invention there is provided a fluid container for a wind turbine, for example to provide lubricating composition to one or more parts of the wind turbine apparatus.

The container may supply a lubricant composition to the apparatus, or may supply fluid other than lubricant to the apparatus. For example, the fluid may comprise a fuel composition, for example gasoline or diesel The container of an aspect of the invention may be for supply the fluid for example to the fuel supply system of the apparatus. For example, the container may supply fuel to a vehicle, or tool, for example to a car, motorcycle or lawn mower.

In another example, the container is used to supply a fluid, for example lubricant and/or fuel, to a hand tool, for example a hedge trimmer or leaf blower.

The fluid may comprise for example an aqueous or other solvent-based composition, for example a cleaning composition. The fluid may for example comprise windscreen wash fluid. A container of an example of an aspect of the invention may be for supplying fluid to the windscreen washer fluid delivery system for example of a vehicle.

In some examples of aspects of the invention the fluid system may comprise a fluid circulation system or a fluid delivery system.

An aspect of the invention provides a replaceable fluid container for an apparatus, the container comprising:
  a housing comprising a fluid reservoir;
  an outlet port arranged on the housing to couple the reservoir in fluidic communication with a fluid system of the apparatus for supplying fluid from the reservoir to the apparatus;
  an inlet port arranged on the housing to couple the reservoir in fluidic communication with the fluid system of the apparatus for receiving fluid from the apparatus to the reservoir; and
  a vent port arranged on the housing to couple the reservoir in fluidic communication with the apparatus for allowing gas to be passed into and out from the reservoir,
wherein the inlet, outlet and vent ports are arranged on a common end of the housing and are arranged such that the distance between the vent port and the nearest of the inlet port and outlet port is greater than the distance between the inlet port and the outlet port.

It will be understood that the present invention has been described above purely by way of example, and modification of detail can be made within the scope of the invention.

Each feature disclosed in the description, and (where appropriate) the claims and drawings may be provided independently or in any appropriate combination.

The invention claimed is:

1. A container comprising:
  a housing comprising a fluid reservoir and a coupling mechanism;
  an outlet port arranged on the coupling mechanism to couple the reservoir in fluidic communication with a fluid system of an apparatus for supplying fluid from the reservoir to the apparatus;
  an inlet port arranged on the coupling mechanism to couple the reservoir in fluidic communication with the fluid system of the apparatus for receiving fluid from the apparatus to the reservoir; and
  a vent port arranged on the coupling mechanism to couple the reservoir in fluidic communication with the apparatus for allowing gas to be passed into and out from the reservoir,
  wherein the inlet, outlet and vent ports are arranged on a common end of the coupling mechanism and are arranged such that the distance between the vent port and the nearest of the inlet port and outlet port is greater than the distance between the inlet port and the outlet port, and
  wherein the coupling mechanism is arranged such that the container is connected to couple the reservoir in fluidic communication with the fluid system by relative movement between the container and the apparatus that is in a rotational direction.

2. A container as claimed in claim 1 in which the inlet port, the outlet port and the vent port are arranged in a linear radial alignment on the end of the coupling mechanism.

3. A container as claimed in claim 1 in which the inlet port, outlet port and vent port are arranged on the end of the coupling mechanism in a non-linear radial alignment such that the radial distance between the vent port and the nearest of the inlet port and outlet port is greater than the radial distance between the inlet port and the outlet port.

4. A container as claimed in claim 3 in which the vent port is arranged radially outermost of the inlet port, outlet port and vent port.

5. A container as claimed in claim 1 in which at least one sealing or separating member is provided around at least one of the ports or between at least two of the ports.

6. A container as claimed in claim 1 in which the coupling mechanism is arranged such that the container is connected to couple the reservoir in fluidic communication with the fluid system by relative movement between the container and the apparatus that is in a rotational direction through an angle of less than 360 degrees.

7. A container as claimed in claim 1 in which the reservoir contains a fluid.

8. A container as claimed in claim 7 in which the fluid is an engine lubricating oil composition or a heat exchange fluid for an electric engine.

9. An apparatus comprising a container as claimed in claim 1 in fluidic communication with a fluid system of the apparatus through the inlet port and outlet port and in fluidic communication with the apparatus through the vent port.

10. An apparatus as claimed in claim 9 in which the apparatus comprises an engine, and the container is in fluidic communication with a fluid system of the engine through the inlet port and outlet port and in fluidic communication with the engine through the vent port.

11. A container comprising:
  a housing comprising a fluid reservoir;
  an outlet port arranged on the housing to couple the reservoir in fluidic communication with a fluid system of an apparatus for supplying fluid from the reservoir to the apparatus;
  an inlet port arranged on the housing to couple the reservoir in fluidic communication with the fluid system of the apparatus for receiving fluid from the apparatus to the reservoir; and
  a vent port arranged on the housing to couple the reservoir in fluidic communication with the apparatus for allowing gas to be passed into and out from the reservoir,
  wherein the inlet, outlet and vent ports are arranged on a common end of the housing and are arranged such that the distance between the vent port and the nearest of the inlet port and outlet port is greater than the distance between the inlet port and the outlet port.

12. A container as claimed in claim 11 in which the inlet port, the outlet port and the vent port are arranged in a linear radial alignment on the end of the housing.

13. A container as claimed in claim 11 in which the inlet port, outlet port and vent port are arranged on the end of the housing in a non-linear radial alignment such that the radial distance between the vent port and the nearest of the inlet port and outlet port is greater than the radial distance between the inlet port and the outlet port.

14. A container as claimed in claim 11 in which the vent port is arranged radially outermost of the inlet port, outlet port and vent port.

15. A container as claimed in claim 11 in which at least one sealing or separating member is provided around at least one of the ports or between at least two of the ports.

16. A container as claimed in claim 11 in which the housing further comprises a coupling mechanism and the inlet port, outlet port and vent port are arranged on the coupling mechanism.

17. A container as claimed in claim 16 in which the coupling mechanism is arranged such that the container is connected to couple the reservoir in fluidic communication with the fluid system by relative movement between the container and the apparatus that is in a rotational direction.

18. A container as claimed in claim 16 in which the coupling mechanism is arranged such that the container is connected to couple the reservoir in fluidic communication with the fluid system by relative movement between the container and the apparatus that is in a rotational direction through an angle of less than 360 degrees.

19. A container as claimed in claim 11 in which the reservoir contains a fluid.

20. A container as claimed in claim 19 in which the fluid is an engine lubricating oil composition or a heat exchange fluid for an electric engine.

* * * * *